United States Patent
Gee et al.

(10) Patent No.: US 6,474,176 B1
(45) Date of Patent: Nov. 5, 2002

(54) FLUID FLOW MEASURING DEVICES AND METHODS FOR DETERMINING FLUID FLOW RATES IN SOILS

(75) Inventors: Glendon W. Gee; Jason C. Ritter, both of Richland; Anderson L. Ward, Kennewick; Randy R. Kirkham, Benton City, all of WA (US)

(73) Assignee: Battelle Memorial Institute, Richland, WA (US)

( * ) Notice: Subject to any disclaimer, the term of this patent is extended or adjusted under 35 U.S.C. 154(b) by 104 days.

(21) Appl. No.: 09/624,185

(22) Filed: Jul. 25, 2000

(51) Int. Cl.[7] ................................. G01F 1/44
(52) U.S. Cl. ................ 73/861.63; 73/204.21; 73/152.33
(58) Field of Search .............. 73/861.63, 152.12, 73/152.05, 152.18, 152.21, 152.29, 152.33, 204.21

(56) References Cited

U.S. PATENT DOCUMENTS

| | | | | |
|---|---|---|---|---|
| 4,787,251 A | * | 11/1988 | Kolodjski | 73/755 |
| 5,608,171 A | * | 3/1997 | Hunter et al. | 73/861.63 |

OTHER PUBLICATIONS

T. Ren et al., Determining Soil Water Flux and Pore Water Velocity by a Heat Pulse Technique, 64 Soil Sci. Soc. Am. J. 552–560 (2000).

* cited by examiner

Primary Examiner—Benjamin R. Fuller
Assistant Examiner—Corey D. Mack
(74) Attorney, Agent, or Firm—Wells St. John P.S.

(57) ABSTRACT

A fluid flow device for determining fluid flow rates in soils includes a conduit for receiving a fluid. The conduit has a reduced channel portion to form a reduced channel portion which amplifies the fluid flow rate of the fluid. A sensor device is coupled in sensing relation relative to the conduit and configured for measuring the amplified fluid flow rate as the fluid flows through the reduced channel portion.

1 Claim, 2 Drawing Sheets

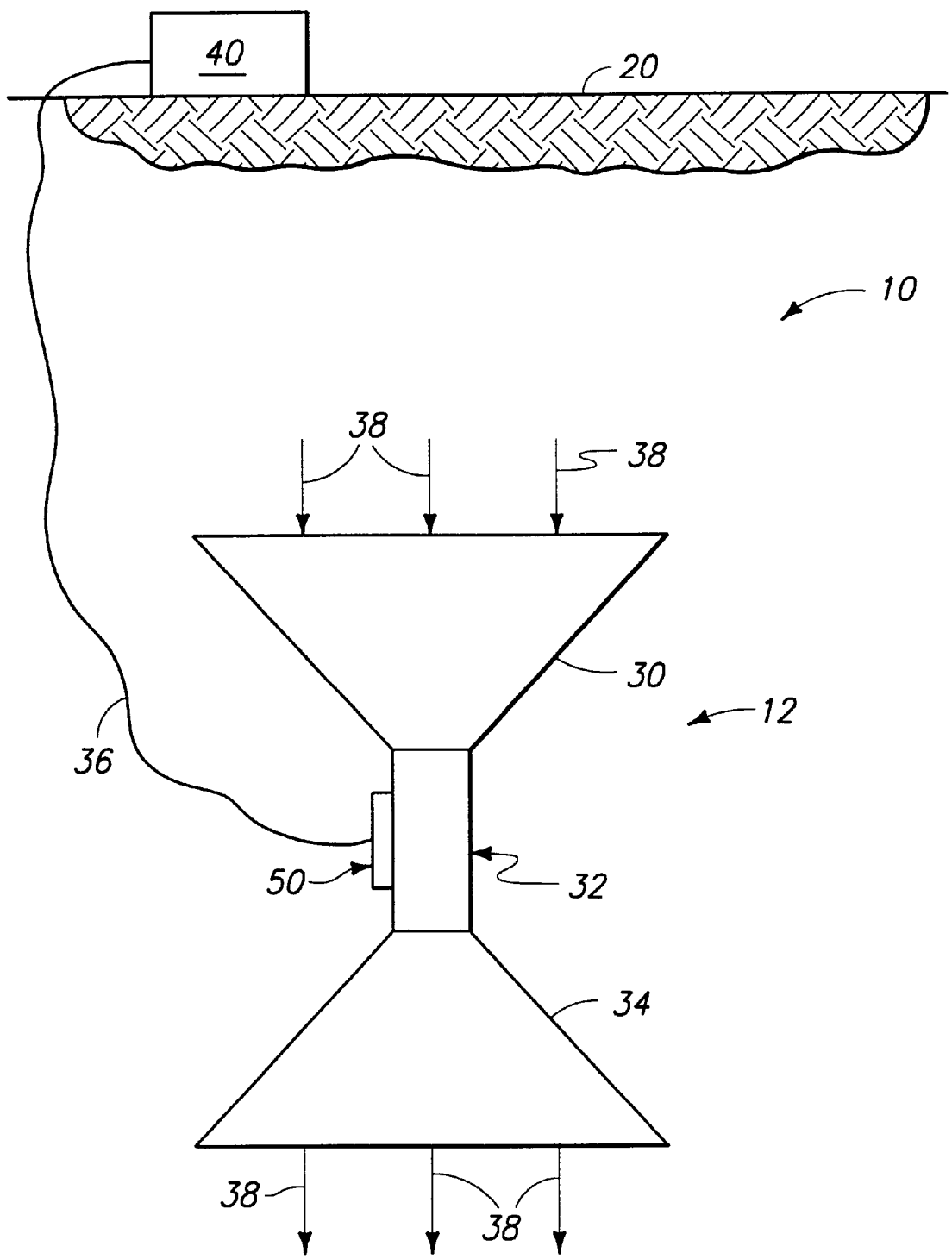
_FIG. 1_

FLUID FLOW MEASURING DEVICES AND METHODS FOR DETERMINING FLUID FLOW RATES IN SOILS

TECHNICAL FIELD

The present invention relates to fluid flow measuring devices, methods for determining fluid flow rates, and more specifically, fluid flow measuring devices for determining fluid flow rates in soils.

BACKGROUND OF THE INVENTION

Determining the rate of fluid flow, or fluid flux, in an earthen profile is important to many scientific and engineering disciplines, as well as to environmental, agricultural and other industries who are dependant, at least in part, on the mechanics and dynamics of water in a given earthen profile. For example, the agriculture/horticultural industry is greatly benefitted when the groundwater flux of soil can be accurately monitored such that irrigation can be controlled to optimize the rate of plant growth. Moreover, the associated leaching of minerals and nutrients could be monitored to predict the needs of crops at the root zone, particularly shallow rooted crops such as potatoes where leaching rates are the greatest. Still further, in the landfill industry, and in particular, hazardous waste sites which use impermeable layers (e.g. asphalt or compacted clay) to retard or prevent seepage of hazardous waste into the soil and ultimately the water supply, the monitoring of the performance of the respective layers is imperative. Yet further, for recreational facilities, such as golf courses, the greatest expenditure for the grounds is the construction and maintenance of the greens. Accordingly, monitoring the water flux below the greens is important to establish the water and nutrient needs for the delicate grasses used.

Fluid flow rates for the applications discussed above deal with fluid flows in unsaturated soils (commonly referred to as the "vadose zone"). Groundwater and other fluids that enter the soil percolate from a soil-moisture zone through the unsaturated zone to an aquifer (a stratum of permeable rock beneath the earthen profile that stores water). The fluids are constantly in motion and the flow through the unsaturated zone is complicated with the actual rate dependent on the transmissivity through the soil (based on factors of soil composition, atmospheric and other pressure gradients, interstices configuration, etc.) and storage capacity of the aquifer. Accordingly, a wide range of flow rates may occur in the soil over a period of time. For example, flow rates are normally high during the rainy season in relative comparison to that seen during the dry season.

However, as compared to the rate of surface water flow, soil flow rates are relatively slow which makes accurate measurements of same difficult. Heretofore, devices designed to measure fluid flow rates in soils were seen as cost prohibitive for many applications, and largely ineffective for measuring ranges of flow rates. For example, hazardous waste sites use expensive drainage lysimeter systems where drainage flow rates of less than 50 mm/year are of interest.

One prior art means for measuring fluid flow rates is thermal dissipation technology. This technology is based on the principle that thermal energy from a heat source in a fluid medium traveling away from the heat source dissipates heat in the direction of the fluid flow quicker than against the direction of fluid flow. However, prior art devices incorporating this technology are employed for measuring ranges of fluid flow rates not occurring in unsaturated soils.

Therefore, a need exists to provide an inexpensive fluid flow measuring device for measuring fluid flow rates occurring in unsaturated soils which avoid the prior art deficiencies noted above.

BRIEF DESCRIPTION OF THE DRAWINGS

Preferred embodiments of the invention are described below with reference to the following accompanying drawings.

FIG. 1 is a side elevation view of a fluid flow measuring device in accordance with a first embodiment of the present invention.

OBJECTS AND SUMMARY OF INVENTION

Figure 2:
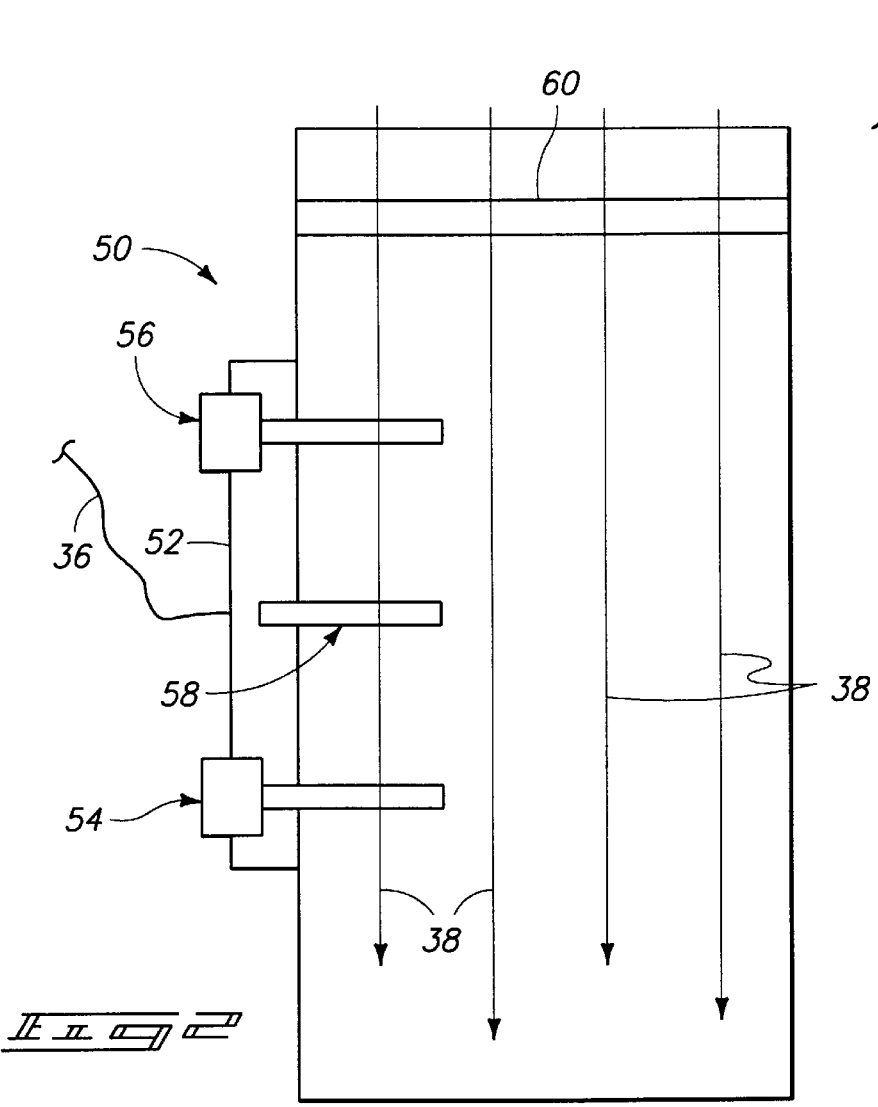
FIG. 2 is a greatly enlarged, longitudinal sectional view of the reduced channel portion of the venturi portion of the fluid flow measuring device shown in FIG. 1.

Therefore, one aspect of the present invention is to provide an improved fluid flow measuring device and method for determining fluid flow rates.

Another aspect of the present invention is to provide a fluid flow measuring device that includes a conduit having a reduced channel portion, and wherein the conduit has a diameter of about 20 centimeters and the reduced channel portion has a diameter of about 0.6 centimeters.

Another aspect of the present invention is to provide a fluid flow measuring device that includes a conduit comprising a converging conical section and a diverging conical section, and wherein the reduced channel portion provides fluid communication between the converging and diverging conical sections.

Another aspect of the present invention is to provide a fluid flow measuring device that includes a reduced channel portion to produce substantially laminar fluid flow.

Another aspect of the present invention is to provide a fluid flow measuring device that includes a reduced channel portion to receive fluid now rates ranging from about 30 mm/yr to about 1000 mm/yr before amplification.

Another aspect of the present invention is to provide a fluid flow measuring device that includes a measuring device buried in the earth below grade, and the fluid flow measuring device includes a data logger and display positioned above grade and electrically coupled to a sensor device.

Another aspect of the present invention is to provide a fluid flow measuring device that includes a reduced channel portion to receive fluid flow rates ranging from about 5 mm/yr to about 200 mm/yr before amplification.

Another aspect of the present invention is to provide a fluid flow measuring device that includes a reduced channel portion having a porous medium configured such that measurements made by the sensor device are attributed only to a fluid flow within a conduit.

Another aspect of the present invention is to provide a fluid flow measuring device that includes a reduced channel portion to amplify fluid flow rates of less than or equal to about 1,000 mm/yr.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The apparatus of the subject invention is best understood by a study of FIG. 1 and is generally indicated by the numeral 10. As shown in FIG. 1, the apparatus includes a conduit 12 for receiving a fluid 38 traveling through a below grade earthen soil 20. The conduit 12 forms a venturi tube comprising a converging conical section 30, a diverging conical section 34, and a reduced channel portion generally indicated by the numeral 32. The reduced channel portion 32 is cylindrical with reduced diametric dimensions relative diametric dimensions of conical sections 30 and 34. The reduced channel portion 32 is coupled in fluid communication with the converging and diverging conical sections 30 and 34. A sensor device, generally indicated by numeral 50, is positioned below grade earthen soil 20 and coupled in sensing relation relative the conduit 12. A data logger and display 40 is positioned above grade earthen soil 20 and is electrically coupled by way of an electrical lead 36 in sensing relation to sensor device 50 for monitoring and displaying fluid flow rates. It should be understood that the conduit 12 may comprise various configurations, the various configurations forming a reduced channel portion within the conduit 12.

Referring now to FIG. 2, the sensor device 50 and reduced channel portion 32 are shown in greater detail. In one aspect of the invention, the sensor device 50 comprises a thermoanemometer borne by the reduced channel portion 32. The sensor device 50 comprises a pair of temperature detectors 54 and 56; and a heating element 58. The temperature detectors are thermally isolated from the surrounding environment (soil) by an insulating material 52. The heating element 58 is positioned between the temperature detectors 54 and 56 such that temperature detector 56 is positioned upstream relative to fluid flow 38, and the temperature detector 54 is positioned downstream relative to fluid flow 38. A porous uniform substrate material, for example, a porous medium 60 cooperates or otherwise occludes the conduit 12, and as shown, is positioned in the reduced channel portion 32. It should be understood that the porous medium 60 is positioned within conduit 12 with a portion of porous medium 60 elevationally upstream from sensor device 50. The porous medium 60 comprises openings (not shown) to receive and filter fluid 38, or ground water, from other debris, for example soil, before the fluid 38 reaches the sensor device 50.

Figure 3:
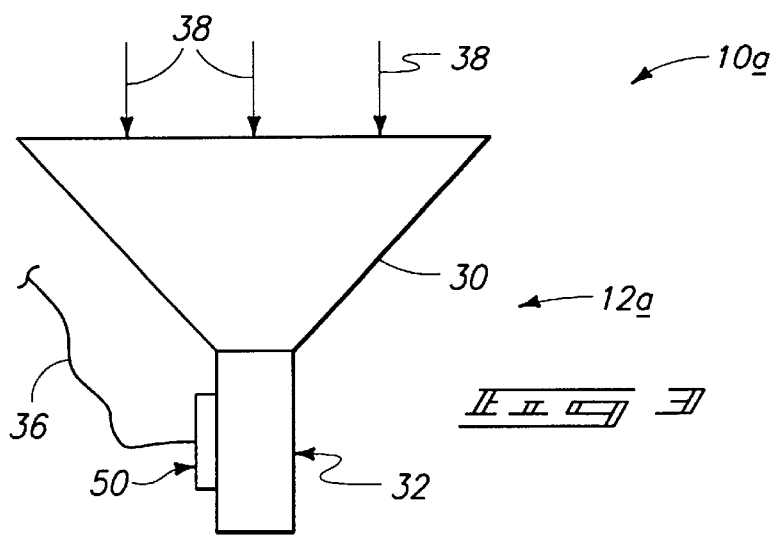
FIG. 3 is a side elevation view of a fluid flow measuring device in accordance with a second embodiment of the present invention.

In referring to the subsequent figure, similar numbering to that utilized in describing the first embodiment of FIG. 1 will be used, with differences indicated by the suffix "a". Referring to FIG. 3, a second embodiment of the fluid flow measuring device is illustrated and is generally indicated by the numeral 10a. The fluid flow measuring device includes a conduit 12a for receiving a fluid 38 traveling through a below grade earthen soil (shown in FIG. 1). The conduit 12a comprises a converging conical section 30 and a reduced channel portion 32. The reduced channel portion 32 is cylindrical with reduced diametric dimensions relative diametric dimensions of converging conical section 30. The reduced channel portion 32 is coupled in fluid communication with the converging conical sections 30. A sensor device, generally indicated by numeral 50, is positioned below grade earthen soil and coupled in sensing relation relative the conduit 12a. A data logger and display, as illustrated in FIG. 1, is positioned above grade earthen soil and is electrically coupled by way of an electrical lead 36 in sensing relation to sensor device 50 for monitoring and displaying fluid flow rates.

OPERATION

The operation of the described embodiment of the present invention is believed to be readily apparent and is summarized below. The device 10 is positioned below grade in the soil 20 and positioned to receive fluid 38 from the soil. The fluid 38 is funneled through the converging conical section 30 into the reduced channel portion where the fluid flow rate is increased or amplified as is understood by principles of physics for venturi tubes. The thermoanemometer 50 is thermally coupled to the amplified fluid flow 38 such that the temperature detectors 54 and 56 measure a temperature differential in the fluid. Preferably, a substantially laminar fluid flow is provided over sensor device 50 with the porous medium 60 filtering debris from the fluid so the temperature differential measured is associated strictly to the fluid being monitored independent of the soil composition in which the device is imbedded. In this document, "substantially laminar" means a fluid flow within accepted tolerances for fluid flow measuring devices of the type described.

The heating element 58 provides thermal energy which dissipates into the fluid and elevates the temperature of the fluid 38 by thermal conduction and gravitational convection. The temperature detectors 54 and 56 are equidistant from the heating element 58 and if a fluid flow is zero, no difference in temperature is measured by the detectors 54 and 56, (i.e., no temperature differential is seen because heat dissipated from the heating element 58 through the fluid will reach both detectors 54 and 56 in generally the same period of time). However, as fluid moves through the reduced channel portion 32 past the detectors 54 and 56, the downstream temperature detector 54 detects a temperature increase in the fluid 38 due to the forced convection before the upstream temperature detector 56. Accordingly, a temperature deferential is established in the fluid and that temperature deferential is measured. Since the temperature deferential is related to the fluid flow rate, device 10 is calibrated to determine the fluid flow rate by monitoring temperature differentials and matching them with the associated fluid flow rates.

The inventors have discovered that by increasing or amplifying the fluid flow 38, a larger temperature differential is provided. This temperature differential permits a less sensitive sensor device 50 to be utilized with the invention. Accordingly, the operational ranges for the present invention are not dependent upon the flow rate of a fluid. Rather, the size of the convergence area, that is, where the fluid first enters the converging section, will determine the actual fluid flow rate range that may be measured. In one embodiment of the invention, an operational range of fluid flow rates to be received by the fluid flow measuring device receives is more than two orders of magnitude, for example, from less than about 10 mm/year to more than about 1000 mm/year. In another embodiment of the invention, the cross-sectional area of converging conical section 30 has a large diameter of 20.0 cm and the cross-sectional area of reduced channel portion 32 has a diameter of 0.6 cm to amplify a fluid flow rate generally of 30 mm/year to more than 1000 mm/year.

In yet another embodiment of the invention, the cross-sectional area of converging conical section 30 has a large diameter of about 50.0 cm and the cross-sectional area of reduced channel portion 32 has a diameter of 0.6 cm to amplify a fluid flow rate generally of 5 mm/year to more than 200 mm/year. It should be understood that straightforward rules of amplification from venturi tube principles provide for scaling the diametric dimensions of the converging conical section 30 and the reduced channel portion 32 as desired to measure any given fluid flow rate range.

It should be understood that fluid flow measuring devices of the present invention are not limited to use in soil substrates and are operational in a variety of media, for example, permeable or porous media.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fluid flow measuring device for determining unsaturated fluid flow rates in below grade earthen soils, comprising:

a conduit for receiving a fluid which is traveling under the influence of gravity and in a generally vertical direction downwardly through the below grade earthen soil and at a fluid flow rate of less than about 1000 millimeters per year, and wherein the conduit is substantially vertically oriented and lies in immediate contact with the below grade earthen soil, and wherein the conduit comprises a converging conical section which receives below grade earthen soil and which is further operable to receive the fluid which is traveling in the generally vertical direction downwardly through the below grade earthen soil, a diverging conical section disposed in spaced relation relative to the converging conical section, and a channel portion which has a diametral dimension of about 0.6 centimeters, and which has an upstream end which is coupled in fluid communication to the converging conical section, and an opposite downstream end which is coupled in fluid flowing communication with the diverging conical section, and wherein the conduit is operable to receive the fluid which is traveling substantially downwardly under the influence of gravity, and to amplify the fluid flow rate of the fluid by at least one order of magnitude;

a porous medium mounted in substantially occluding relation relative to the upstream end of the channel portion, and which allows the passage of the fluid which is traveling substantially vertically downwardly under the influence of gravity, and which further substantially produces a substantially laminar fluid flow of the fluid in the channel portion, and wherein the porous medium substantially prohibits the entry of the below grade earthen soil into the channel portion;

a heater borne by the channel portion and which is operable to impart heat energy to the substantially laminar flow of fluid traveling substantially vertically downwardly through the channel portion;

a first temperature sensor borne by the channel portion and which is located in temperature sensing relation relative to the substantially laminar flow of fluid, and which is further oriented in spaced, upstream relation relative to the heater, and wherein the first temperature sensor is substantially thermally isolated from the surrounding earthen soil which lies in contact with the channel portion;

a second temperature sensor borne by the reduced channel portion and which is located in temperature sensing relation relative to the substantially laminar flow of the fluid, and which is further oriented in spaced, downstream relation relative to the heater, and wherein the second temperature sensor is substantially thermally isolated from the surrounding earthen soil which lies in contact with the channel portion, and wherein a temperature differential is established in the substantially laminar fluid flow in the channel portion and which is measured by the first and second temperature sensors; and a data logger and display positioned above grade, and which are electrically coupled with each of the heater and the first and second temperature sensors, and wherein the data logger and the display calculate from the temperature differential the amplified fluid flow rate of the substantially laminar flow moving substantially vertically downwardly through the channel portion.

* * * * *

UNITED STATES PATENT AND TRADEMARK OFFICE
CERTIFICATE OF CORRECTION

PATENT NO.     : 6,474,176 B1
DATED          : November 5, 2002
INVENTOR(S)    : Glendon W. Gee et al.

It is certified that error appears in the above-identified patent and that said Letters Patent is hereby corrected as shown below:

Column 2,
Line 40, replace "fluid now rates" with -- fluid flow rates --.

Signed and Sealed this

Eighth Day of April, 2003

JAMES E. ROGAN
*Director of the United States Patent and Trademark Office*